United States Patent
Medendorp, Jr. et al.

(10) Patent No.: US 9,195,095 B2
(45) Date of Patent: Nov. 24, 2015

(54) LED LIGHTING DEVICES INCORPORATING WAVEGUIDES

(71) Applicant: Cree, Inc., Durham, NC (US)

(72) Inventors: Nicholas W. Medendorp, Jr., Raleigh, NC (US); Norbert Hiller, Chapel Hill, NC (US); Russell G. Villard, Apex, NC (US)

(73) Assignee: Cree, Inc., Durham, NC (US)

(*) Notice: Subject to any disclaimer, the term of this patent is extended or adjusted under 35 U.S.C. 154(b) by 0 days.

(21) Appl. No.: 14/030,224

(22) Filed: Sep. 18, 2013

(65) Prior Publication Data

US 2014/0091332 A1    Apr. 3, 2014

Related U.S. Application Data

(60) Continuation of application No. 13/228,580, filed on Sep. 9, 2011, now Pat. No. 8,564,737, which is a division of application No. 12/983,684, filed on Jan. 3, 2011, now Pat. No. 8,564,739, which is a division of (Continued)

(51) Int. Cl.
   *G02F 1/29* (2006.01)
   *G02F 1/1335* (2006.01)
   *F21V 8/00* (2006.01)

(52) U.S. Cl.
   CPC ........ *G02F 1/133615* (2013.01); *G02B 6/0076* (2013.01); *G02F 1/133524* (2013.01); *G02F 1/133603* (2013.01); *G02B 6/0028* (2013.01); *G02B 6/0038* (2013.01); *G02B 6/0068* (2013.01)

(58) Field of Classification Search
   CPC ........... G02F 1/00; G02F 1/29; G02F 1/1335; G02F 1/133615; G02F 1/133524
   USPC ................... 349/661, 62–63, 64, 61
   See application file for complete search history.

(56) References Cited

U.S. PATENT DOCUMENTS

| | | | |
|---|---|---|---|
| 5,299,042 A * | 3/1994 | Takanashi et al. | 349/7 |
| 5,479,275 A * | 12/1995 | Abileah | 349/5 |
| 6,288,700 B1 * | 9/2001 | Mori | 345/102 |
| 6,350,041 B1 | 2/2002 | Tarsa et al. | |

(Continued)

FOREIGN PATENT DOCUMENTS

| EP | 1775623 A1 | 4/2007 | |
|---|---|---|---|
| EP | 1775623 A1 * | 4/2007 | G02B 6/00 |

(Continued)

OTHER PUBLICATIONS

Yu, Michael, "Backlight Technology Overview", "http://www.densitron.com/uploadedFiles/Displays/Products/whitepaper17.pdf", Feb. 16, 2006, pp. 1-18, Publisher: Densitron Technologies, plc.

(Continued)

*Primary Examiner* — Kaveh Kianni
(74) *Attorney, Agent, or Firm* — Withrow & Terranova, P.L.L.C.; Vincent K. Gustafson

(57) ABSTRACT

A LED lighting device includes at least one waveguide element and multiple light-emitting sources such as LEDs or LED packages, which may be optically coupled though different light entry regions to the at least one waveguide. Multiple light solid state sources may be arranged in strips. A waveguide system includes first and second body structures each positioned to illuminate at least a portion of a target surface. One or more waveguides may be arranged to illuminate a LCD panel.

8 Claims, 9 Drawing Sheets

Related U.S. Application Data application No. 11/829,912, filed on Jul. 29, 2007, now Pat. No. 7,872,705, said application No. 14/030,224 is a continuation of application No. 13/184,102, filed on Jul. 15, 2011, now Pat. No. 8,564,742, which is a continuation of application No. 12/983,684, which is a division of application No. 11/829,912, said application No. 14/030,224 is a continuation of application No. 12/983,684, which is a division of application No. 11/829,912.

(56) References Cited

U.S. PATENT DOCUMENTS

| | | | |
|---|---|---|---|
| 6,697,130 B2 | 2/2004 | Weindorf et al. | |
| 6,753,661 B2 | 6/2004 | Muthu et al. | |
| 6,874,900 B2* | 4/2005 | Hsieh | 362/26 |
| 6,895,154 B2* | 5/2005 | Johnson et al. | 385/125 |
| 6,921,178 B2* | 7/2005 | Ohkawa | 362/620 |
| 6,964,497 B2 | 11/2005 | Greiner | |
| 6,978,071 B2* | 12/2005 | Hwang et al. | 385/134 |
| 7,133,093 B2* | 11/2006 | Ochiai et al. | 349/70 |
| 7,195,364 B2 | 3/2007 | Hahm et al. | |
| 7,210,815 B2* | 5/2007 | Imade | 362/234 |
| 7,325,932 B2* | 2/2008 | Sakata | 353/85 |
| 7,331,682 B2* | 2/2008 | Lee et al. | 362/19 |
| 7,514,662 B2* | 4/2009 | Kawakami | 250/205 |
| 7,515,131 B2* | 4/2009 | Takeda | 345/87 |
| 7,548,287 B2* | 6/2009 | Oh | 349/65 |
| 7,576,309 B2* | 8/2009 | Kawakami | 250/205 |
| 7,614,775 B2* | 11/2009 | Iwasaki | 362/616 |
| 7,872,705 B2 | 1/2011 | Medendorp et al. | |
| 8,029,180 B2* | 10/2011 | Takahashi | 362/612 |
| 8,564,737 B2 | 10/2013 | Medendorp, Jr. et al. | |
| 8,564,739 B2 | 10/2013 | Medendorp, Jr. et al. | |
| 8,564,742 B2 | 10/2013 | Medendorp, Jr. et al. | |
| 2001/0038532 A1 | 11/2001 | Harbers et al. | |
| 2004/0042194 A1* | 3/2004 | Hsieh | 362/31 |
| 2004/0130515 A1 | 7/2004 | Chang et al. | |
| 2004/0263500 A1* | 12/2004 | Sakata | 345/204 |
| 2005/0002110 A1* | 1/2005 | Imade | 359/640 |
| 2005/0024848 A1* | 2/2005 | Lee et al. | 362/31 |
| 2005/0052590 A1* | 3/2005 | Ochiai et al. | 349/71 |
| 2005/0122741 A1* | 6/2005 | Takata | 362/613 |
| 2005/0169012 A1* | 8/2005 | Takeuchi | 362/602 |
| 2005/0259939 A1* | 11/2005 | Rinko | 385/146 |
| 2006/0002146 A1* | 1/2006 | Baba | 362/613 |
| 2006/0022935 A1* | 2/2006 | Sakai et al. | 345/102 |
| 2006/0077688 A1* | 4/2006 | Uehara et al. | 362/613 |
| 2006/0083019 A1* | 4/2006 | Hahm et al. | 362/555 |
| 2006/0114690 A1* | 6/2006 | Iki et al. | 362/612 |
| 2006/0125772 A1* | 6/2006 | Takeda | 345/102 |
| 2006/0186826 A1* | 8/2006 | Miyazawa | 315/169.4 |
| 2006/0215388 A1* | 9/2006 | Hamada | 362/29 |
| 2006/0245209 A1* | 11/2006 | Jeong et al. | 362/612 |
| 2007/0008456 A1* | 1/2007 | Lesage et al. | 349/62 |
| 2007/0018185 A1* | 1/2007 | Hung | 257/98 |
| 2007/0019129 A1 | 1/2007 | Negley | |
| 2007/0063943 A1* | 3/2007 | Tanaka et al. | 345/87 |
| 2007/0064444 A1* | 3/2007 | Kim et al. | 362/612 |
| 2007/0115670 A1 | 5/2007 | Roberts et al. | |
| 2007/0171341 A1* | 7/2007 | Kim et al. | 349/114 |
| 2007/0236443 A1* | 10/2007 | Lee | 345/102 |
| 2007/0242718 A1* | 10/2007 | Kawakami | 372/50.12 |
| 2007/0247872 A1* | 10/2007 | Lee et al. | 362/616 |
| 2007/0297168 A1* | 12/2007 | Chang et al. | 362/223 |
| 2008/0002099 A1* | 1/2008 | Oh | 349/65 |
| 2008/0019149 A1* | 1/2008 | Chang et al. | 362/616 |
| 2008/0089072 A1* | 4/2008 | Kim et al. | 362/294 |
| 2008/0175129 A1* | 7/2008 | Tanaka et al. | 369/112.23 |
| 2008/0192458 A1 | 8/2008 | Li | |
| 2008/0285306 A1* | 11/2008 | Sugihara et al. | 362/617 |
| 2009/0040426 A1* | 2/2009 | Mather et al. | 349/65 |
| 2009/0073721 A1 | 3/2009 | Kamikatano et al. | |
| 2009/0091920 A1* | 4/2009 | Naijo et al. | 362/97.3 |
| 2009/0185394 A1* | 7/2009 | Takahashi | 362/613 |
| 2009/0257215 A1* | 10/2009 | Gomi | 362/97.1 |
| 2009/0322985 A1 | 12/2009 | Mizuuchi | |
| 2010/0027293 A1 | 2/2010 | Li | |
| 2011/0026269 A1 | 2/2011 | Oh | |
| 2011/0096263 A1 | 4/2011 | Medendorp et al. | |
| 2011/0273645 A1 | 11/2011 | Medendorp et al. | |
| 2011/0317093 A1 | 12/2011 | Medendorp et al. | |

FOREIGN PATENT DOCUMENTS

| | | | | |
|---|---|---|---|---|
| JP | H7-176794 A | 7/1995 | | |
| JP | 11218758 A | 8/1999 | | |
| JP | 2003/222864 A | 8/2003 | | |
| JP | 2006/00016 A | 1/2006 | | |
| JP | 2006/04076 A | 2/2006 | | |
| JP | 2006039520 A | 2/2006 | | |
| JP | 2006/120594 A | 5/2006 | | |
| JP | 2006/286935 A | 10/2006 | | |
| JP | 2007/063943 A | 3/2007 | | |
| JP | 2007063943 A | * | 3/2007 | |
| JP | 2008235245 A | 10/2008 | | |
| KR | 10-0438522 A | 7/2004 | | |
| WO | WO 0208417 A1 | 10/2002 | | |
| WO | WO 02084173 A1 | * | 10/2002 | F21V 8/00 |
| WO | WO 2004/068909 A1 | 8/2004 | | |
| WO | WO 2005/001892 A2 | 1/2005 | | |
| WO | WO 2006/002146 A2 | 1/2006 | | |
| WO | WO 2007/061758 A1 | 5/2007 | | |
| WO | WO 2007/074933 A1 | 7/2007 | | |

OTHER PUBLICATIONS

European Search Report issued in corresponding European Patent Application No. EP 11 17 5110 on Nov. 8, 2012 (mailed Nov. 20, 2012).

Official Action corresponding to Japanese Patent Application No. 2011-217599 dated Jun. 25, 2013.

Official Action corresponding to U.S. Appl. No. 13/184,102 dated Jan. 3, 2013.

Official Action corresponding to U.S. Appl. No. 13/228,580 dated Jan. 29, 2013.

Official Action corresponding to U.S. Appl. No. 12/983,684 dated Nov. 8, 2012.

Official Action corresponding to U.S. Appl. No. 12/983,684 dated Apr. 19, 2013.

Official Action corresponding to U.S. Appl. No. 13/184,102 dated May 30, 2013.

Examination Report for European Patent Application No. 11175110.3 mailed Apr. 9, 2014, 5 pages.

Decision of Patent Grant for Japanese Patent Application No. 2011-217599, mailed Mar. 31, 2015, 4 pages.

Notice of Reason(s) for Rejection for Japanese Patent Application No. 2011-217599, mailed Jul. 29, 2014, 9 pages.

\* cited by examiner

LED LIGHTING DEVICES INCORPORATING WAVEGUIDES

STATEMENT OF RELATED APPLICATIONS

This application is a continuation of U.S. patent application Ser. No. 13/228,580 filed on Sep. 9, 2011, subsequently issued as U.S. Pat. No. 8,564,737 on Oct. 22, 2013, which in turn is a divisional of U.S. patent application Ser. No. 12/983,684 filed on Jan. 3, 2011, subsequently issued as U.S. Pat. No. 8,564,739 on Oct. 22, 2013, which in turn is a divisional of U.S. patent application Ser. No. 11/829,912 filed on Jul. 29, 2007, subsequently issued as U.S. Pat. No. 7,872,705 on Jan. 18, 2011. This application is also a continuation of U.S. patent application Ser. No. 13/184,102 filed on Jul. 15, 2011, subsequently issued as U.S. Pat. No. 8,564,742 on Oct. 22, 2013, which in turn is a continuation of U.S. patent application Ser. No. 12/983,684 filed on Jan. 3, 2011, subsequently issued as U.S. Pat. No. 8,564,739 on Oct. 22, 2013, which in turn is a divisional of U.S. patent application Ser. No. 11/829,912 filed on Jul. 29, 2007, subsequently issued as U.S. Pat. No. 7,872,705 on Jan. 18, 2011. Further, this application is a continuation of U.S. patent application Ser. No. 12/983,684 filed on Jan. 3, 2011, subsequently issued as U.S. Pat. No. 8,564,739 on Oct. 22, 2013, which in turn is a divisional of U.S. patent application Ser. No. 11/829,912 filed on Jul. 29, 2007, subsequently issued as U.S. Pat. No. 7,872,705 on Jan. 18, 2011. Benefit of the filing dates of the above-referenced U.S. patent applications is claimed under 35 U.S.C. 120. The contents of the foregoing applications and patents are hereby incorporated by reference herein, for all purposes.

TECHNICAL FIELD

The invention relates generally to lighting devices and, in specific aspects, to liquid crystal displays having enhanced lighting uniformity.

BACKGROUND

Traditional display panels, such as cathode ray tube (CRT) displays are being replaced by more advanced alternatives, such as liquid crystal displays (LCDs) and plasma displays. These newer display technologies offer various advantages over traditional CRT technology, including reduced weight; thinner profile; superior color, contrast and brightness in the resulting display; and reduced power consumption.

LCDs typically include an array of pixels arranged in front of a light source, lighting panel, or reflector. Each pixel includes a layer of liquid crystal material, and two filters, with one filter serving to polarize light horizontally and the other filter serving to polarize light vertically. A reflective LCD has a reflective layer (such as a mirror) behind the pixels and is lit by either a frontlight or ambient light. A transmissive LCD is lit by a backlight, in an arrangement where the pixels are arranged in front of a light source and light from the light source is transmitted through the pixels to the front of the LCD or the viewing area, resulting in a "lit" pixel. Light sources for backlighting may include electroluminescent panels/foils (ELs), cold cathode fluorescent lamps (CCFLs), hot cathode fluorescent lamps (HCFLs) External Electrode Fluorescent Lamps (EEFLs), traditional incandescent light bulbs, or light emitting diodes (LEDs). High intensity discharge lamps (HIDs) may also be used in certain backlighting applications.

When LEDs are utilized as light sources for transmissive LCD backlighting, they may be traditional or side view LEDs. Side view LEDs are also known as "side emitting LEDs" or "side looker LEDs." A side view LED is a packaged LED that emits light parallel to the plane of the surface to which the package is mounted. Compared to traditional LED packages, side view LED packages are thinner and typically less expensive to manufacture. A typical side view LED package has dimensions of about 1.5 mm by about 0.5-0.7 mm, but such dimensions may vary. Owing at least in part to their small size, side view LED packages have limited current handling capabilities, thus limiting their emissions. As a result, a single side view LED package typically has less output capability than a traditional LED package. Whether accidentally or deliberately, practitioners often "overcurrent" side view LEDs to achieve greater output, which can lead to overheating and failure of a device incorporating such LEDs.

Current LED lighting techniques for transmissive LCDs include either direct backlighting or backlighting by edge illumination. While a backlight will light the pixels from the backside, that light may come from directly behind the center of the pixels (direct backlighting) or from behind the sides of the pixels (backlighting by edge illumination). While both techniques are recognized as backlighting, direct backlighting refers to illumination directed axially (centrally) through the backside of pixels. In contrast, edge illumination refers to an arrangement where the light source is located along an edge of a LCD system and lights the pixels from the side. Edge illumination may occur along the side edges of the LCD, the top edge, or the bottom edge. Backlighting of transmissive LCDs may utilize a waveguide to spread the light to an entire LCD panel, with such waveguide having a single entry for light and transmitting the light by internal reflection to be spread over a desired area.

A traditionally LED backlit LCD may include a layered system that includes an array of red, green and blue LEDs positioned on a panel or array of tiles. The panel or tiles include a reflective surface or layer arranged so that light is reflected in the desired direction toward a diffusion layer that diffuses the light provided from the LED backlight and reflects some of the light back toward the reflective surface or layer, thereby functioning to mix the light and improve the light uniformity ("recycling effect"). A brightness enhancement film and/or collimating layer over the reflective layer or surface and the diffusion layer provides light to the LCD panel layers in a more optimal fashion and also acts with the reflective layer or surface and the diffusion layer to enhance the recycling effect. Depending on the embodiment, additional layers or fewer layers can be utilized as is will be appreciated by one skilled in the art. Such a backlight system may also include thermal layers below the LEDs for thermal management. As such, as is understood by one of skill in the art, the LED backlight system provides uniform white light to the LCD panels, which typically include a shutter layer and red, green and blue color filters.

The above-described traditionally lit screens have several inherent limitations. In the context of direct backlighting with a LED, a traditional LED package emits light directly at (i.e., through) a LCD screen. In order to light the entire screen, the LED must operate at high power and be very thick if utilized without a waveguide. Accordingly, the thickness of the resulting LCD system (television, monitor, etc.) is also increased. Modern consumers, however, desire thinner profile systems with thicknesses as small as a few inches. Accordingly, thick LCD systems are not commercially desirable. Additionally, use of high powered traditional LED package without a waveguide may create a "headlight effect" also known as a "hot spot" on the panel, causing a detrimental lack of light uniformity.

With regard to edge illumination, in which a waveguide is used to spread the light emission of a side view LED package disposed on an edge of the LCD, the resulting screen size is limited. As indicated previously, light emission characteristics of side view LED packages are reduced in comparison to traditional LED packages, with such limitation due to their size and current handling capabilities. As a result of the lower light emission, and the single entry for light in the waveguide, one or more portions (i.e., typically the center) of a side view LED-lighted LCD screen may not be lit if the screen is relatively large in size. LCD screens illuminated with side view LED packages and having acceptably uniform illumination characteristics are currently limited to screens of about 12 to 14 inches (diagonal) in size.

Accordingly, a need exists in the art for backlit LCD displays and display systems that are light in weight, have a thin profile, that enable use of large screens, and that are uniformly lit over the entire display with superior color and contrast. These and other needs are addressed with devices and systems according to embodiments of the present invention.

SUMMARY

The present invention provides improved lighting devices including liquid crystal display systems and methods of using the same.

In one aspect, the invention relates to a LED lighting device including at least one waveguide element comprising a plurality of light entry regions; a first light-emitting source comprising at least one first LED positioned to emit light into the at least one waveguide element at a first light entry region of the plurality of light entry regions; and a second light-emitting source comprising at least one second LED positioned to emit light into the at least one waveguide element at a second light entry region of the plurality of light entry regions; wherein the first light-emitting source and the second light-emitting source are arranged to illuminate different regions of a target surface.

In another aspect, the invention relates to a waveguide system comprising: a) a first waveguide element comprising a first body structure, a first substantially flat light-transmissive surface arrangeable to illuminate at least a portion of a target surface, and at least one first light entry region; b) at least one first light-emitting source positioned to emit light into the first waveguide element at the at least one first light entry region; c) a second waveguide element comprising a second body structure, a second substantially flat light-transmissive surface arrangeable to illuminate at least a portion of said target surface, and at least one second light entry region, wherein the second body structure is distinct from the first body structure, and the second light-transmissive surface is distinct from the first light-transmissive surface; and d) at least one second light-emitting source positioned to emit light into the second waveguide element at the at least one second light entry region; wherein the at least one first light-emitting source comprises a first plurality of electrically activated light emitting sources, and the at least one second light-emitting source comprises a second plurality of electrically activated light emitting sources.

In another aspect, the invention relates to a waveguide system comprising: a) a first waveguide element comprising a first body structure, a first substantially flat light-transmissive surface arrangeable to illuminate at least a portion of a target surface, and at least one first light entry region; b) at least one first light-emitting source positioned to emit light into the first waveguide element at the at least one first light entry region; c) a second waveguide element comprising a second body structure, a second substantially flat light-transmissive surface arrangeable to illuminate at least a portion of said target surface, and at least one second light entry region, wherein the second body structure is distinct from the first body structure, and the second light-transmissive surface is distinct from the first light-transmissive surface; and d) at least one second light-emitting source positioned to emit light into the second waveguide element at the at least one second light entry region; wherein the first waveguide element is arranged in contact with the second waveguide element.

In another aspect, the invention relates to a waveguide system comprising: a) a first waveguide element comprising at least one first light entry region; b) a first light-emitting source positioned to emit light into the first waveguide element at the first light entry region; c) at least a second waveguide element comprising at least one second light entry region; and d) at least a second light-emitting source positioned to emit light into the at least a second waveguide element at the at least one second light entry region. Embodiments of the invention also include LCD systems utilizing waveguide systems as described herein.

In another aspect, the invention relates to a liquid crystal display (LCD) system comprising: a) a LCD panel having a peripheral region and an inner region; b) at least one first waveguide element comprising at least one first light entry region at an edge of said LCD panel and arranged to backlight the peripheral region of said LCD panel; c) at least one first light-emitting diode source positioned to emit light into said at least one first light entry region; and d) at least a second light-emitting diode source positioned to emit light for backlighting of the inner region of said LCD panel.

In another aspect, the invention relates to a liquid crystal display (LCD) system comprising: a) a LCD panel; b) at least one waveguide element comprising at least one light entry region, wherein the at least one light entry region comprises an extension of the at least one waveguide element that is non-coplanar with a principal plane of the at least one waveguide element; c) a first light-emitting source positioned to emit light into the at least one waveguide element at the at least one light entry region; and d) at least a second light-emitting source positioned to emit direct backlight onto the LCD panel or positioned to emit light into the at least one waveguide element along an edge thereof.

Methods utilizing waveguide elements and LCD systems are also provided in certain aspects of the invention.

In a further aspect, any of the foregoing aspects may be combined for additional advantage.

These aspects and other aspects and advantages of the invention will be apparent to one skilled in the art upon review of the ensuing disclosure and accompanying drawings.

DETAILED DESCRIPTION

Figure 1A:
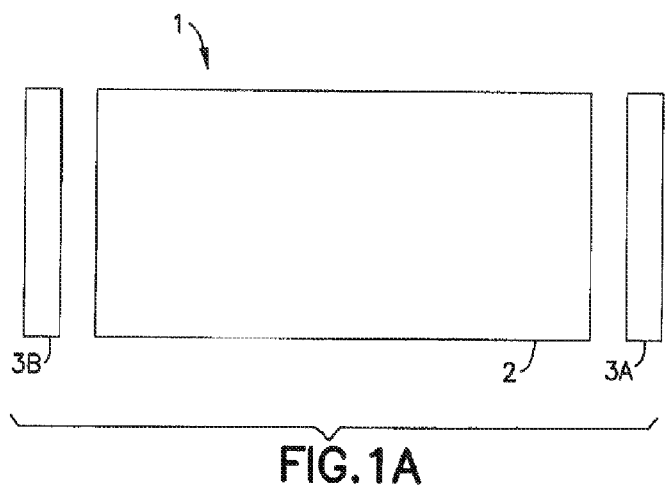
FIG. 1A is a schematic front view illustration of at least a portion of an exemplary LCD system including a waveguide element with edge illumination from two side edges, utilizing a plurality of LEDs arranged in strips as light sources according to one embodiment of the invention.

The present invention relates in various aspects to lighting devices, including improved LCD systems. In one embodiment, a LCD system comprises a LCD panel or screen, at least one waveguide with multiple entry regions for light, and at least two light-emitting sources positioned to emit light into the at least one waveguide. When the light emitted by the light-emitting sources is optically coupled into the waveguide, the waveguide transmits light sufficient to light the entire LCD panel or screen of the system. Alternatively, multiple waveguides may be employed, each with at least one entry region for light and at least one associated light-emitting source positioned to emit light into the waveguides. With multiple waveguides, each waveguide may be positioned to light a portion of the LCD panel.

A conventional LCD system generally includes a LCD panel and a light source such as a LED optionally coupled to a single waveguide element having a single light entry point. Side view LED packages are desirable for use in LCD systems, due to their low current usage and small size. Due to concerns of overheating, however, the current that can be supplied to side view LED packages is limited, thus limiting their emissions. Consequently, the amount of light that can be emitted from a single side view LED package into a conventional waveguide is also limited. Therefore, side view LED packages coupled to single-input waveguides are not well-suited for use in backlighting LCD panels having viewable diagonal measurements larger than approximately 12-14 inches.

Embodiments of the present invention are not so limited, as they provide for uniform backlighting of panels of any desirable size, including panels having viewable diagonal measurements larger than about 12 inches, without problems such as overheating and creation of "hot spots." LCD systems embodied in the present invention may include, but are not limited to televisions and computer monitors.

Embodiments of the present invention include single waveguides having multiple light entry regions for receiving light from locations other than, and/or in addition to, a single edge of the waveguide. The provision of light into at least one waveguide from multiple entry regions permits low current side view LED packages, whether alone or with other types of light sources, to uniformly light a LCD panel or screen, even if the LCD panel or screen has a viewable surface with a diagonal measurement greater than approximately 12-14 inches.

Embodiments of the present invention also include waveguide systems comprising multiple waveguides each waveguide having at least a single light entry region. Such a waveguide system may be utilized in a LCD system, where each waveguide has a transmissive surface that lights a portion of the LCD panel. The provision of light to multiple waveguides permits use of low current side view LED packages, whether alone or with other types of light sources, to uniformly light the LCD panel.

A LCD system according to the present invention may include any suitable type of conventional LCD panel or screen. Generally, a LCD panel includes LCD pixels arranged in front of a light source or reflective surface to illuminate the pixels. Furthermore, the LCD may include an LCD shutter panel and/or color filters, such as RGB color filters, as are known to those of skill in the art.

In one embodiment, a LCD system according to the present invention includes a transmissive LCD, such that the light is provided to the LCD panel or screen from behind via at least one waveguide element. Preferably the at least one waveguide element disperses the light in an even and complete manner, such that the entire panel is lit consistently and at a consistent intensity. A single waveguide element may be utilized, or multiple waveguide elements may be utilized with a single LCD panel. A waveguide element is a device utilized to guide optical waves from a light entry region to a transmissive surface or exit region of the waveguide element. A waveguide element may comprise a hollow structure with a reflective internal surface; alternatively, a waveguide may be substantially solid in nature. Glass, quartz, plexiglass, and other optically transmissive materials may be employable in the fabrication of transmissive portions of waveguides, with reflective materials such as metals further employed to fabricate reflective portions. Other materials such as glass and plastic may be employed to fabricate additional portions of the waveguide. To minimize loss of light from the waveguide element from an area other than the transmissive surface or exit region, the waveguide element may also be surrounded in whole or in part by a material such as plastic to reflect any light back into the element. In one embodiment, the waveguide includes a prism. At least a portion of a waveguide may be substantially planar or tubular in shape, or of any other configuration known to those of skill in the art. Total internal reflection is desirable, such that all of the light supplied to the waveguide element from associated light source(s) is transmitted out of the waveguide element via the transmissive surface. Internal reflection guides the optical waves to a transmissive surface of the waveguide element, which is optically coupled to provide light to the LCD screen or panel, such that the LCD panel or screen may be lit by the transmitted light. A waveguide is generally utilized in an arrangement where the LCD panel or screen is located between the waveguide element and a viewer.

When a single waveguide element is used, the waveguide preferably has multiple light entry regions. Additionally, the transmissive surface of the waveguide element and the viewable surface of the LCD panel or screen are preferably of substantially the same size. Optionally, the waveguide may contain gaps or holes to allow light from a direct backlight to the LCD panel or screen.

Waveguides utilized in LCD systems according to the invention may be utilized in combination, and when multiple waveguides are employed in a waveguide system, each may have one or more light entry regions. Light enters the one or more light entry regions of a waveguide and is transmitted to the transmissive surface thereof. A transmissive surface is preferably substantially flat to conform to a LCD panel. This transmissive surface provides backlight to the LCD panel, and is capable of lighting the viewable surface of the LCD panel or screen. In a LCD system of the invention, one or more waveguides may be utilized in lighting the LCD panel or screen.

When multiple waveguide elements are used, each waveguide preferably has at least one light entry region. The combined transmissive surface area of the waveguide elements is preferably substantially the same as that of the viewable surface area of the LCD panel or screen. Each waveguide of the group may light a different portion of the LCD panel, or the combined transmission may light substantially the entire LCD panel. In another embodiment, when multiple waveguides are utilized, the waveguides may be spaced sufficiently to allow light from a direct backlight to the LCD screen or panel or any of the individual waveguides of the group may contain gaps or holes to allow light from a direct backlight to the LCD panel or screen. When multiple waveguides are employed, they may abut one another laterally, or at least portions thereof may be disposed in a front-to-back or layered relationship if desired. In one embodiment, multiple upstream waveguides may be optically coupled to a downstream waveguide to promote easy fabrication and/or enhance uniformity of light distribution.

A light entry region of a waveguide element according to the invention may be adapted to receive light from one or more light sources. Light entry regions may be arranged along any convenient portion of a waveguide element. If a front portion of a waveguide is optically coupled to transmit light to a LCD panel or screen, then light entry regions may be disposed along any of a top edge, a first side edge, a second side edge, a bottom edge, and a back side of the waveguide element.

A waveguide element of the invention may be also adapted for use with a direct backlight source. As described above, a traditionally backlit LCD system includes a layered system which may include a direct backlight and, optionally, thermal layers under the light source, reflective layer(s), diffusion layer(s), brightness enhancement film(s) and/or collimating layer(s). In one embodiment of the invention the waveguide element of the invention is adapted for use with a direct backlight source, such that the waveguide element is included within or in addition to the layered backlight system. Where direct backlighting is provided in the LCD system of the invention, inclusion and orientation of such layers, films, and elements, including one or more waveguide elements, are provided to optimize the direct backlight transmitted to the LCD panel or screen. In one embodiment a waveguide element is provided between the direct backlight source and the diffusion layer. In another embodiment, the waveguide element serves as a diffusion layer.

Multiple waveguides may form a "waveguide system" such that in one embodiment, light transmitted from each of the waveguides is coupled to provide light to the LCD panel or screen of a LCD system. A waveguide system in another embodiment may include two or more waveguides arranged in a layered configuration, where each waveguide provides light to a different portion of a LCD panel, such that the entire panel is substantially illuminated by the waveguide system. Each individual waveguide within the waveguide system includes one or more light entry regions, to which one or more light sources are optically coupled. Each waveguide also includes a transmissive surface or an exit region, where light exits the waveguide. A transmissive surface may comprise glass, quartz, or other optically transmissive materials, and may be referred to as a "prismatic" section of the waveguide. Portions of the waveguide not comprising a transmissive surface may comprise materials without prismatic or transmissive properties. The waveguide may also comprise a material or be surface treated such that a light shined directly at the waveguide will enter the waveguide or pass through the waveguide. Optionally, layered waveguides may be alternated with layers of diffusers and/or "light shaping" components.

Figure 6A:
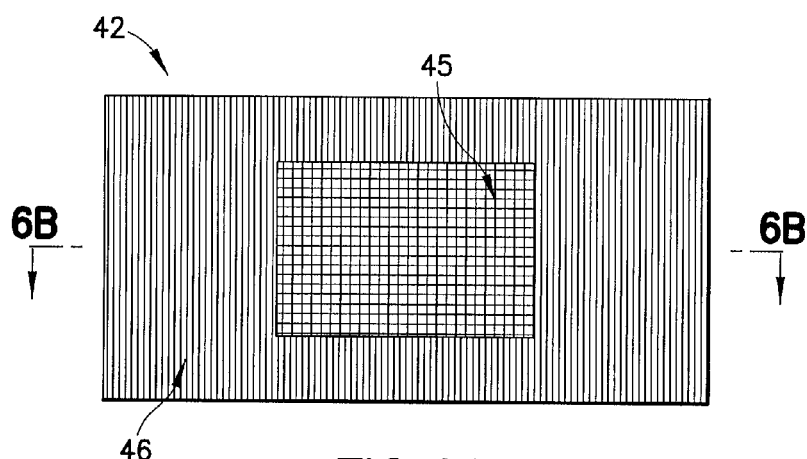
FIG. 6A is a schematic front view illustration of a lit LCD screen, lighted by a waveguide system containing two waveguides, according to one embodiment of the invention.
Figure 6B:
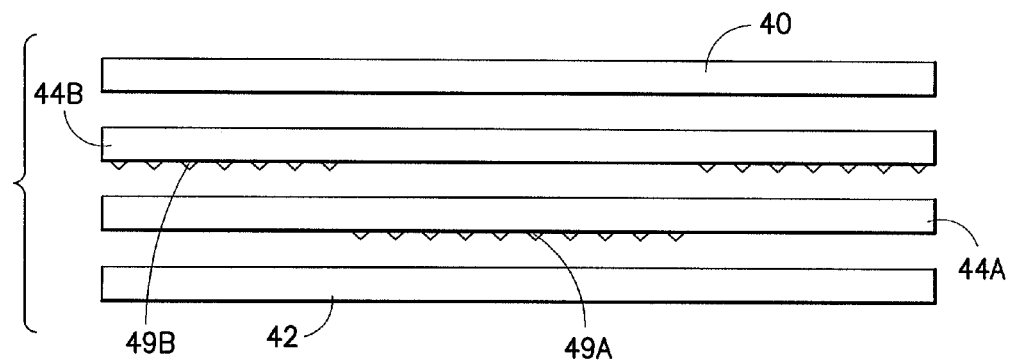
FIG. 6B is a cross-sectional view illustration of the LCD screen of FIG. 6A and at least a portion of an associated waveguide system arranged to light the LCD screen.

In an exemplary LCD system according to one embodiment of the invention, a waveguide system including two layered waveguides is used, where the first waveguide may light a central or interior region of the LCD screen and the second waveguide may light a peripheral or outer region of the LCD screen. FIG. 6A illustrates a LCD screen 42 lit by a two layer waveguide system according to one embodiment of the invention. On the lighted screen 42, a first waveguide (not shown) is arranged to provide lighting to a central portion 45 of the LCD screen 42 and a second waveguide (not shown) is arranged to provide lighting to a peripheral or outer section 46 of the LCD screen 42. Each waveguide of the waveguide system preferably receives light from at least one different light source (not shown). FIG. 6B provides a cross-sectional view of an exemplary waveguide system 41 used to light a LCD screen 42 such as illustrated in FIG. 6A, taken along section lines B-B of FIG. 6A. As can be seen in FIG. 6B, in the exemplary two waveguide system 41, the waveguide layers 44A, 44B may be of similar size to one another. The waveguides 44A, 44B are positioned in a layered configuration, such that one waveguide 44A is positioned between the second waveguide 44B and the LCD screen 42. Each waveguide 44A, 44B has a transmissive or prismatic portion 49A, 49B on a major surface that emits light toward the LCD screen 42. Each waveguide 44A, 44B lights a portion of the LCD screen 42, such that the LCD screen 42 is substantially lit. A waveguide system may optionally be backed by a mirror or white light diffuser 40, and/or may contain additional diffusers or light shaping components (not shown) between the waveguide layers 44A, 44B.

Figure 7A:
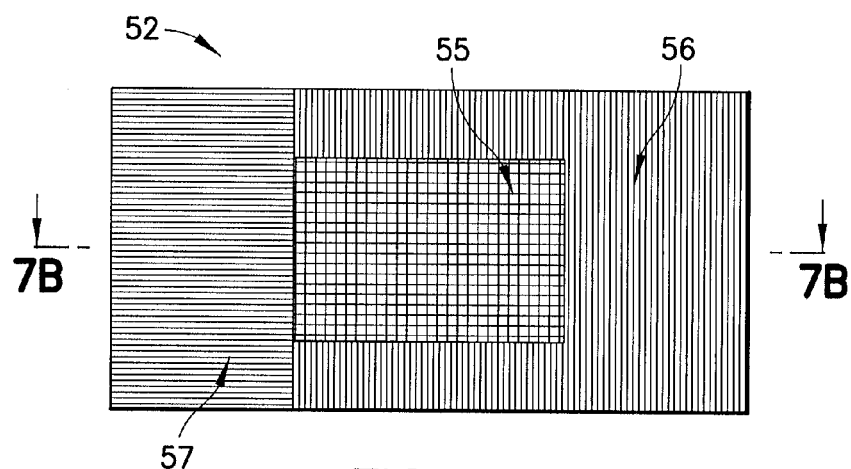
FIG. 7A is a schematic front view illustration of a lit LCD screen, lighted by a waveguide system containing three waveguides, according to one embodiment of the invention.
Figure 7B:
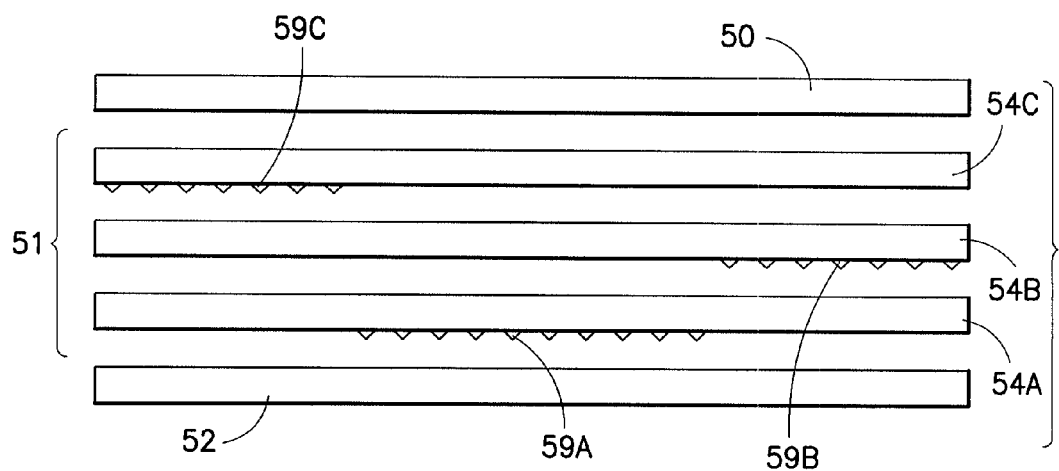
FIG. 7B is a cross-sectional view illustration of the LCD screen of FIG. 7A and at least a portion of an associated waveguide system arranged to light the LCD screen according to one embodiment of the invention.

In one embodiment according to the present invention, a waveguide system includes three layered waveguides, with a first waveguide lighting a central or interior region of the LCD screen, a second waveguide lighting a first portion of a peripheral or exterior region of the LCD screen, and a third waveguide lighting a second (e.g., remaining) portion of the peripheral or exterior region of the LCD screen. FIG. 7A illustrates an exemplary lit LCD screen 52 utilizing a three layer waveguide system 51. On the lighted screen 52, a first waveguide (not shown) is arranged to provide lighting to a first portion 55 along the center of the LCD screen 52, a second waveguide (not shown) is arranged to provide lighting to a second portion 56 along the exterior of the LCD screen 52 and a third waveguide (not shown) is arranged to provide lighting to a third portion 57 along a remaining exterior portion of the LCD screen 52. Each waveguide 54A-54C of the waveguide system preferably receives light from at least one different light source (not shown). FIG. 7B provides a cross-sectional view of an exemplary waveguide system 51 used to light LCD screen 52 as illustrated in FIG. 7A, taken along section lines B-B of FIG. 7A. As can be seen in FIG. 7B, each waveguide layer 54A-54C of the exemplary three waveguide system 51 may be of similar size. The waveguides 54A-54C are positioned in a layered configuration, such that one waveguide 54A is positioned closest to the LCD screen 52 and the third waveguide 54C is positioned furthest from the LCD screen 52, with the second waveguide 54B positioned between the first and third waveguides 54A, 54C. Each waveguide 54A-54C has a transmissive or prismatic portion 59A-59C on a major surface thereof that emits light toward the LCD screen 52. Each waveguide 54A-54C lights a portion of the LCD screen 52, such that the entire LCD screen 52 is substantially lit. The waveguide system 51 may optionally be backed by a mirror or white light diffuser 50, and/or may contain additional diffusers or light shaping components (not shown) between the waveguide layers 54A-54C.

In another embodiment according to the present invention, four layered waveguides are provided. In such an arrangement, the waveguides may each provide light to a different portion (e.g., quadrants) of a LCD screen.

Figure 8A:
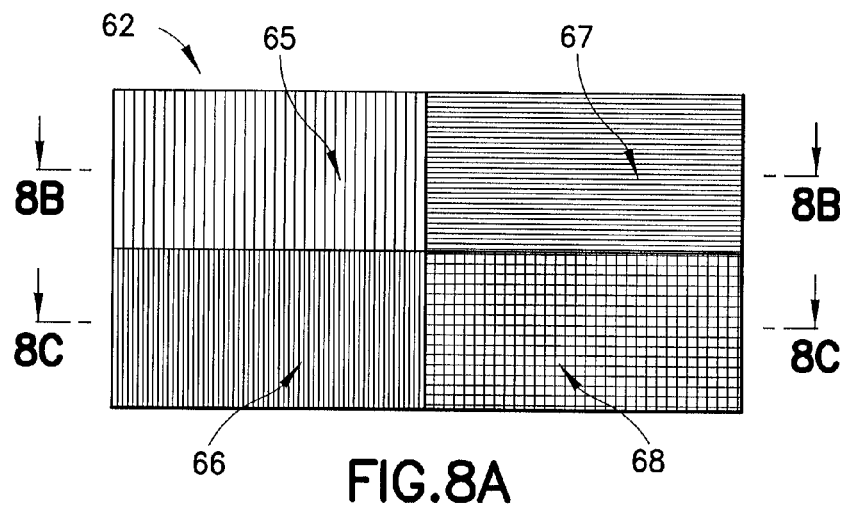
FIG. 8A is a schematic front view illustration of a lit LCD screen, lighted by a waveguide system containing four waveguides, according to one embodiment of the invention.
Figure 8B:
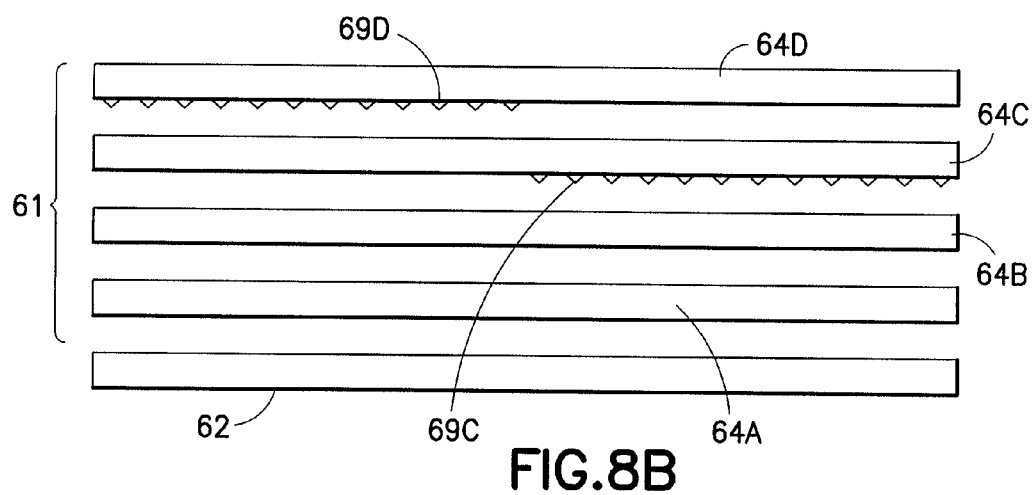
FIGS. 8B and 8C are cross-sectional view illustrations of LCD screen of FIG. 8A and at least a portion of an associated waveguide system arranged to light the LCD screen, according to one embodiment of the invention.
Figure 8C:
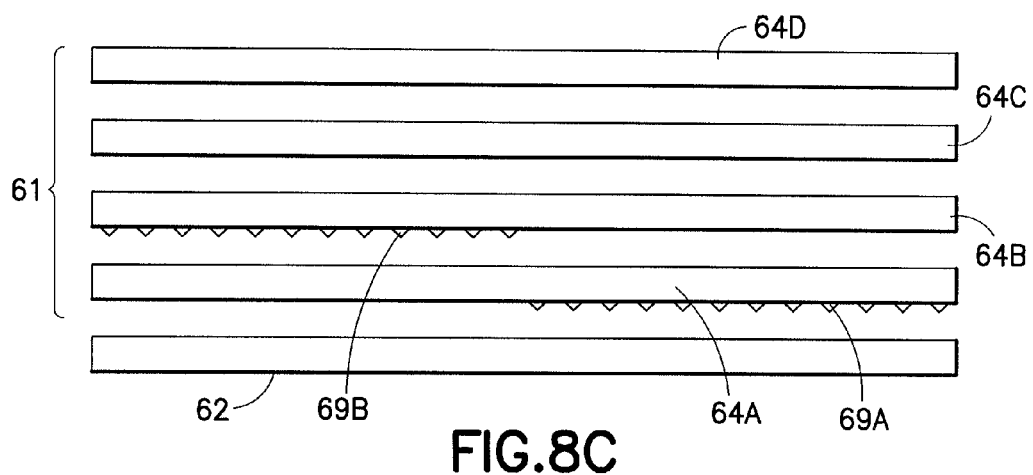

FIG. 8A illustrates such an exemplary LCD screen 62 lit by a four layer waveguide system. On the exemplary lit screen 62, a first waveguide (not shown) is arranged to provide lighting to a first portion 65 corresponding to an upper left quadrant of the LCD screen 62, a second waveguide (not shown) is arranged to provide lighting to a second portion 66 corresponding to a lower left quadrant of the LCD screen 62, a third waveguide (not shown) is arranged to provide lighting to a third portion 67 corresponding to an upper right quadrant of the LCD screen 62, and a fourth waveguide (not shown) is arranged to provide lighting to a fourth portion 68 corresponding to a lower right quadrant of the LCD screen 62. Each waveguide of the waveguide system preferably receives light from at least one different light source (not shown). FIG. 8B provides a first cross-sectional view of a waveguide system 61 useable to light the LCD screen 62 of FIG. 8A, taken along section lines B-B of FIG. 8A. FIG. 8C provides an alternative cross-sectional view of a first waveguide system useable to light the LCD screen 62 of FIG. 8A, taken along section lines C-C. As can be seen in FIGS. 8B and 8C, in the exemplary four waveguide system 61, the waveguide layers 64A-64D are of similar size to one another. The waveguides 64A-64D are positioned in a layered configuration, such that a first waveguide 64A is positioned closest to the LCD screen 61 and a fourth waveguide 64D is positioned furthest from the LCD screen 61, with a second waveguide 64B and a third waveguide 64C positioned between the first and fourth waveguides 64A, 64D. Each waveguide 64A-64D has a transmissive or prismatic portion 69A-69D on its surface that emits light toward the LCD screen 62. Each waveguide 64A-64D lights a portion of the LCD screen 62, such that the entire LCD screen 62 is substantially lit. The waveguide system 61 is optionally backed by a mirror or white light diffuser (not shown) and may contain additional diffusers or light shaping components (not shown) between the waveguide layers 64A-64D.

Figure 9A:
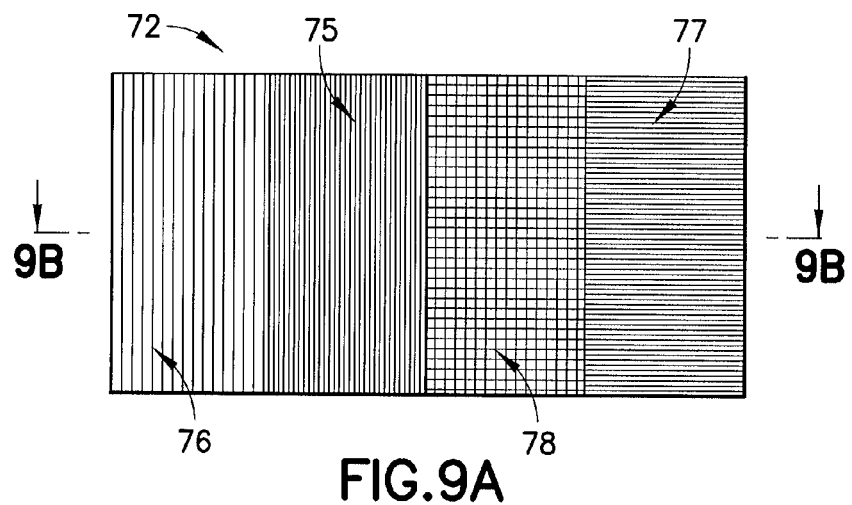
FIG. 9A is a schematic front view illustration of a lit LCD screen, lighted by a waveguide system containing four waveguides, according to one embodiment of the invention.
Figure 9B:
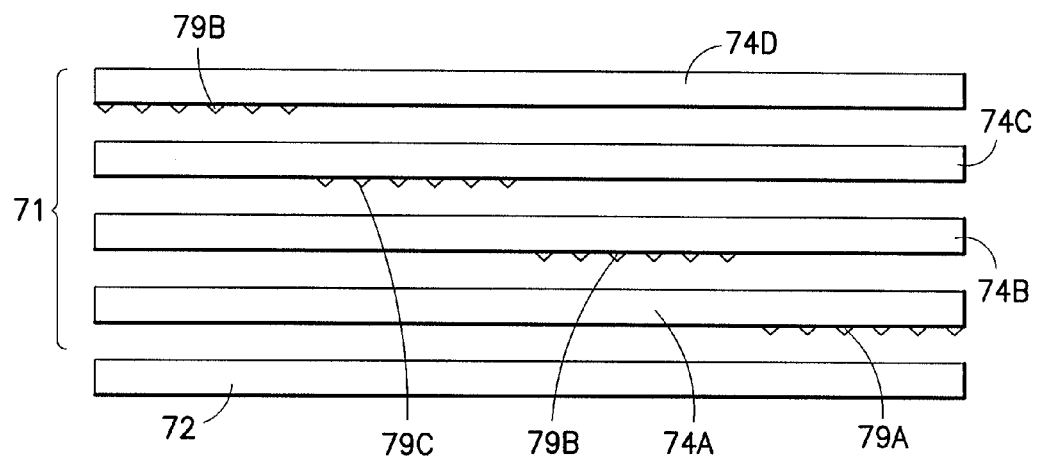
FIG. 9B is a cross-sectional view illustration of the LCD screen of FIG. 9A and at least a portion of an associated waveguide system arranged to light the LCD screen according to one embodiment of the invention.

FIG. 9A illustrates an exemplary LCD screen 72 lit by another four layer waveguide system. On the exemplary lit screen 72, a first waveguide lights a first portion 75 of the LCD screen 72, a second waveguide lights a second portion 76 of the LCD screen 72, a third waveguide lights a third portion 77 of the LCD screen 72, and a fourth waveguide lights a fourth portion 78 of the LCD screen 72. Each waveguide 74A-74D of the waveguide system preferably receives light from at least one different light source (not shown). FIG. 9B provides a cross-sectional view of a waveguide system 71 useable to light the LCD screen 72 of FIG. 9A, taken along section lines B-B of FIG. 9A. As can be seen in FIG. 9B, in the exemplary four waveguide system 71, the waveguide layers 74A-74D are of similar size to one another. The waveguides 74A-74D are positioned in a layered configuration, such that a first waveguide 74A is positioned closest to the LCD screen 72 and a fourth waveguide 74D is positioned furthest from the LCD screen 72, with a second waveguide 74B and a third waveguide 74C positioned between the first and fourth waveguides 74A, 74D. Each waveguide 74A-74D has a transmissive or prismatic portion 79A-79D on its surface that emits light toward the LCD screen 72. Each waveguide 74A-74D lights a portion of the LCD screen 72, such that the entire LCD screen 72 is substantially lit. The waveguide system 71 is optionally backed by a mirror or white light diffuser (not shown) and may contain additional diffusers or light shaping components (not shown) between the waveguide layers 74A-74D.

It is to be understood that the exemplary waveguide systems described above are not limited to the particular transmission configurations provided herein. Any number of waveguides may be arranged in any configuration such that the transmissive sections of the waveguides illuminate various sections of a LCD screen. Transmission by the waveguides in any particular configuration does not have to be evenly distributed among individual waveguides. The exemplary waveguide systems set forth above include waveguides of approximately similar size; however, the waveguides of a waveguide system may be of any size, as long as the resulting transmissive sections of those waveguides illuminate substantially the entire LCD screen.

As described hereinabove, one or more light sources are optically coupled to a waveguide element in various embodiments of the invention. Any number of light sources may be employed to achieve uniform lighting of a LCD panel. While the light sources are optically coupled to emit light into the light entry regions of the waveguide element, the number of light entry regions does not limit the number of light sources. In one embodiment, at least one waveguide element is utilized, including a first light-emitting source positioned to emit light into a first entry region of the at least one waveguide element and a second light-emitting source positioned to emit light into a second entry region of the at least one waveguide element. Additional light-emitting sources and light entry regions may be employed.

A light-emitting source may be positioned anywhere within a LCD system that allows optical coupling of the light emitted into a light entry region. Accordingly, light-emitting sources may be located in or along a side region, a top region, a bottom region and/or a rear region of the LCD system. Light-emitting sources may be spaced apart from corresponding light entry regions, may be adjacent to corresponding light entry regions, and/or may be physically coupled to the corresponding light entry regions. In one embodiment, the light-emitting sources include side view LED packages, the light-emitting sources are arranged to not simultaneously and solely emit light into a top edge and a bottom edge of the waveguide. In such an embodiment, light sources may be arranged in locations other than both the top and bottom edges of the waveguide, or light sources arranged along both the top and bottom edge of a waveguide are supplemented with at least one additional light source arranged to emit light into the waveguide from at least one other location.

Optical coupling between a light source and waveguide element may include any of: directing light to one or more recesses defined a waveguide element, embedding a light source in a waveguide element, and directing light to at least one edge or surface of a waveguide element. The waveguide element does not need to be uniform in shape and, optionally, may contain one or more extensions oriented in any suitable direction, such that the light source may be optically coupled to the waveguide element via the one or more extensions.

As thinner profile LCD systems may be desirable, where waveguide extensions are utilized, they may be optionally oriented in a manner such that they are angled, bent, or curved toward a primary plane of the waveguide element itself and, correspondingly, toward the LCD panel, to achieve a thinner profile system.

In one embodiment, a LCD system may further comprise a light source that is not optically coupled to emit light into the waveguide. An exemplary system includes a light source that directly backlights a LCD panel, supplemented by waveguide-directed light. Light emitted by such a backlight may pass through or around a waveguide or waveguide system disposed between the backlight and the LCD panel, in order to transmit light from the backlight to the LCD panel. In such an embodiment, the backlight provides light to the LCD panel or screen, which light is supplemented in one or more locations by light transmitted by the waveguide or waveguide system.

In another embodiment, a LCD system may further comprise a direct backlight source that is optically coupled into the waveguide as understood by one of skill in the art. An exemplary system includes a light source that provides light optically coupled into the waveguide, where the light source is positioned directly behind the LCD panel. Such direct backlighting may be coupled into the waveguide by any means known to those of skill in the art. In one embodiment the LED is provided at the end of a waveguide extension. Such a waveguide extension may be oriented in any manner as more fully described above. Preferably such an extension is short and the backlight is flush with the extension. In another embodiment the waveguide comprises such a material or is surface-treated such that a direct backlight shined on the waveguide will enter the waveguide through the surface and will be optically coupled to light provided to the waveguide through additional light entry sources. In a still further embodiment, the waveguide contains a light entry source in the form of a notch, or groove or other indentation in the surface of the waveguide, allowing for placement of a direct backlight directly against the waveguide. Light emitted from the direct backlight can therefore be optically coupled directly into the waveguide.

Light sources useful in lighting a LCD panel can include any of: a cold cathode fluorescent lamp (CCFL), a hot cathode fluorescent lamp (HCFL), an electroluminescent panel (ELP), an incandescent light bulb, a light emitting diode (LED), an organic light emitting diode (OLED), a high intensity discharge (HID) lamp, and any combination of the foregoing sources arranged to provide light in additive or spatially discrete arrangement.

Where LEDs are utilized as light sources in embodiments of the present invention, such LEDs are preferably embodied in LED packages. Such packages may include packaged traditional LEDs that emit light from a side opposite the electrode from which they receive current, and/or may be packaged side view LEDs (also known as "side emitting LEDs" or "sidelooker LEDs") that emit light substantially parallel to a plane of the surface on which the package is mounted. A "LED package," as used herein, preferably includes a substrate, an electrode, a LED chip mounted on or over the substrate and an encapsulant disposed on or over the LED chip. A LED package may also include any of: a diffuser, a reflector, a lens, an electrostatic discharge diode, and/or thermal conduction elements.

A light source in a LCD system of the invention may include a LED that emits any of white light, blue light, red light, green light, or light of any desirable wavelength. In one embodiment, a light source includes one or more clusters of red-green-blue (RGB) LEDs. Such clusters may be independently controlled. In another embodiment, a light source includes a blue LED coated or otherwise covered with phosphors to upconvert blue light to white light.

Exemplary combinations of light sources of the invention may include: (1) direct backlighting utilizing one or more side view LEDs, supplemented with edge backlighting utilizing one or more side view LEDs; (2) direct backlighting utilizing one or more traditional LEDs, supplemented with edge backlighting utilizing one or more side view LEDs; (3) direct backlighting utilizing one or more side view LEDs, supplemented with edge backlighting utilizing one or more traditional LEDs; (4) direct backlighting utilizing one or more traditional LEDs, supplemented with edge backlighting utilizing one or more traditional LEDs; and (5) edge backlighting from more than one edge, utilizing one or more side view LEDs or traditional LEDs, or any combinations thereof. Such combinations may include, but are not limited to, single light sources including both traditional and side view LEDs. The foregoing combinations represent mere examples of possible configurations; other configurations may be employed within the scope of the present invention.

A single light source may comprise a plurality of LEDs. The LEDs of such a plurality of LEDs may be arranged in any suitable configuration, whether to enable convenient manufacture, to maximize light emitted into the light entry regions of the at least one waveguide element, or both. Exemplary arrangements include multiple LED packages arranged in a strip, or a single LED package containing multiple LEDs arranged in a strip. Such a strip may contain two or more LEDs or LED packages. Individual LEDs or LED packages within a single strip may be characteristically the same as, or different from, other LEDs or LED packages in the same strip. LEDs or LED packages in a single strip may be adapted to emit substantially the same wavelength, or may be adapted to emit different wavelengths. Additionally, multiple strips may be connected to one another in any suitable orientation, such as in an end-to-end orientation, or in a side-to-side orientation, in order to yield a single composite light source to emit light into the waveguide element. Where multiple strips are utilized, each strip may be adapted to emit light of substantially the same wavelength as other strips, or may be adapted to emit light of wavelengths different from light other strips.

A light source including a strip of LEDs or LED packages may include a circuit board or other common structural support, such that the LEDs may be electrically connected to one another. The LEDs may be further electrically connected to components adapted to provide uniform performance of the plurality of LEDs. Such components may include one or more common control circuits (e.g., integrated circuits or processors) to regulate, for example, power to the LEDs, intensity of the emitted light, wavelength of the emitted light, and/or other parameters. Additionally, a strip of LEDs may include or be connected to one or more common electrostatic discharge (ESD) diodes, providing protection from voltage spikes to multiple LEDs within the strip. Moreover, multiple strips may be subject to control from a single master control circuit or CPU.

Figure 5:
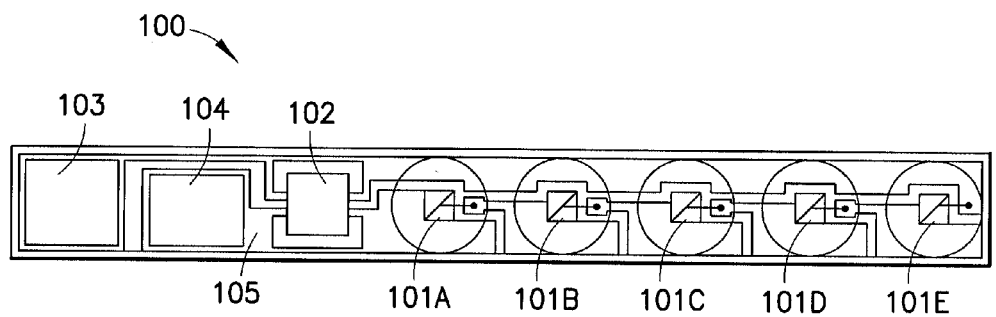
FIG. 5 is a schematic illustration of a plurality of LEDs arranged in a strip for use in a light-emitting source in a LCD system according to one embodiment of the invention.

FIG. 5 illustrates of an exemplary light source for use in a LCD system, including a plurality of LED packages arranged in a strip 100. In a preferred embodiment, the strip 100 has dimensions of 20 mm×2.5 mm and contains five or more LED packages 101A-101E, which may be disposed in series. Optionally, such a strip 100 comprises a circuit board 105 including a 2.5 mil thickness FR4 substrate and 1 oz. copper, electroless Nickel Immersion Gold plating, and does not contain soldermask on the back surface. The strip 100 includes a common ESD diode 102 in electrical communication with the LEDs 101A-101E. Contacts 103, 104 may be provided to serve as common electrical inputs for the strip 100.

It is understood that when a single light source comprises a plurality of LED packages, any desirable number of LED packages may be provided. Factors affecting the makeup of a single light source may include: the size of the panel being lit, the desired viewing angle, the entry angle of the light into the light entry region of the waveguide element, the spacing of the individual LED packages, the brightness of the individual LED packages, and the size of the LED packages. In combination, plural light sources coupled to at least one waveguide utilized in a system as described herein are adapted to uniformly light a LCD panel of any desired size.

Figure 1B:
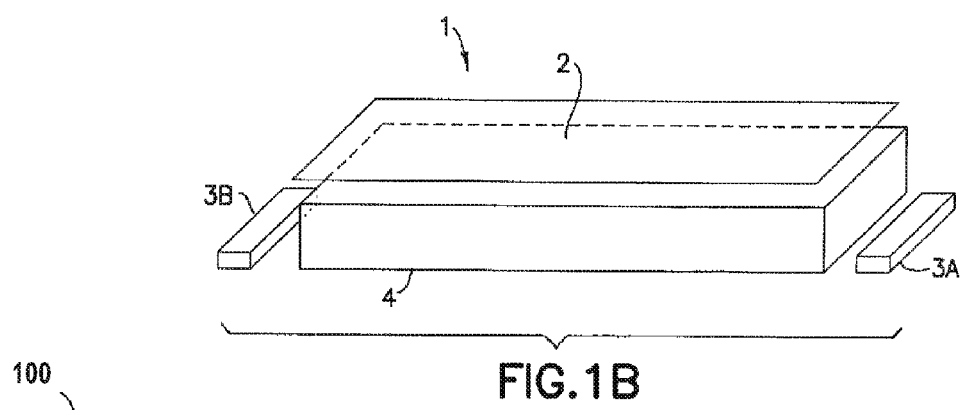
FIG. 1B is a schematic perspective view illustration of the exemplary LCD system of FIG. 1A.
Figure 1D:
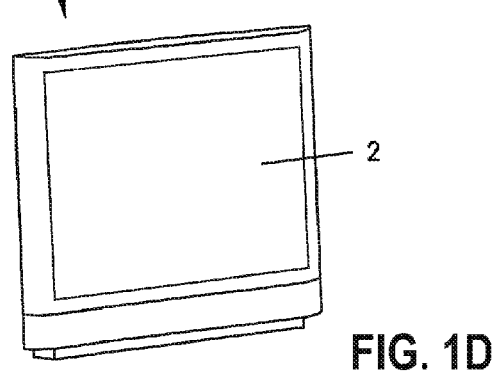
FIG. 1D is a perspective view of a television or computer monitor including a LCD system according to FIG. 1B.
Figure 1C:
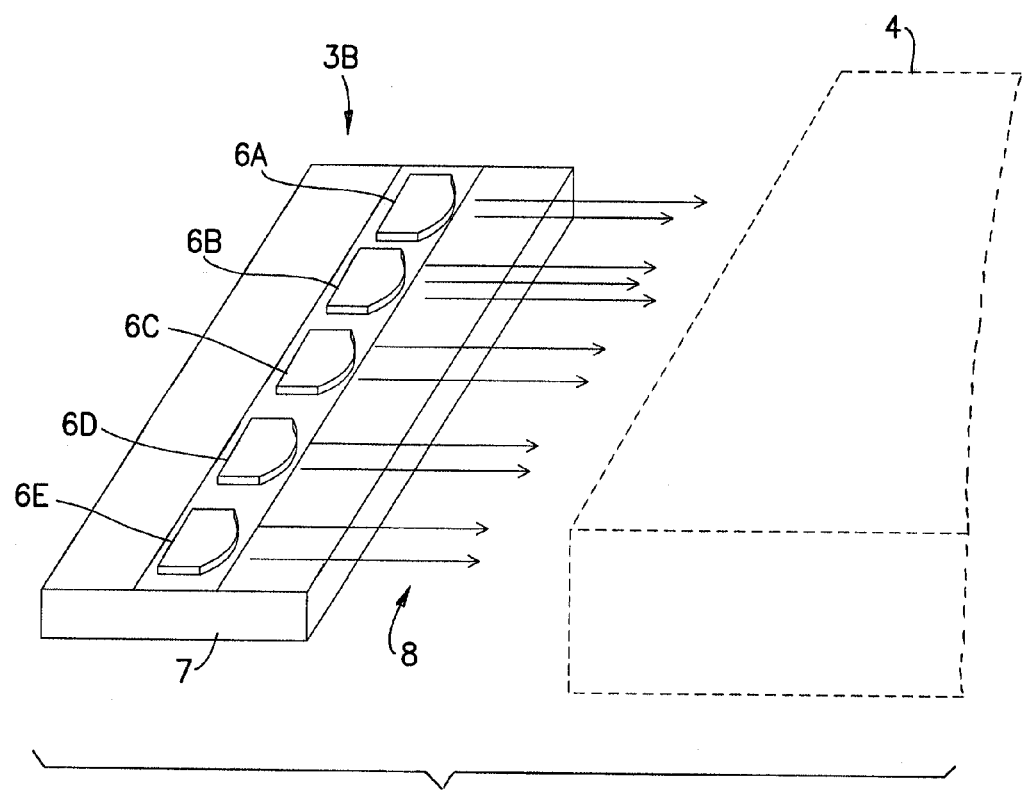
FIG. 1C is a schematic perspective view of the multi-LED strip light source of FIGS. 1A and 1B, disposed adjacent to a waveguide.

FIG. 1A is a schematic front view illustration of at least a portion of an exemplary LCD system 1 including a LCD panel 2 and multiple light sources 3A, 3B. FIG. 1B is a schematic side view illustration of the system of FIG. 1A, depicting the LCD panel 2, light sources 3A, 3B and waveguide element 4. FIG. 1C is a schematic side view illustration of an exemplary light source 3B, comprising a plurality of side view LED packages, 6A-6E arranged as a strip on base 7 and emitting light 8, parallel to the plane of base 7, into waveguide 4. FIG. 1D is a perspective view of a television or computer monitor 100 including a LCD system according to FIG. 1B, with the LCD panel 2 arranged in the foreground.

Figure 2:
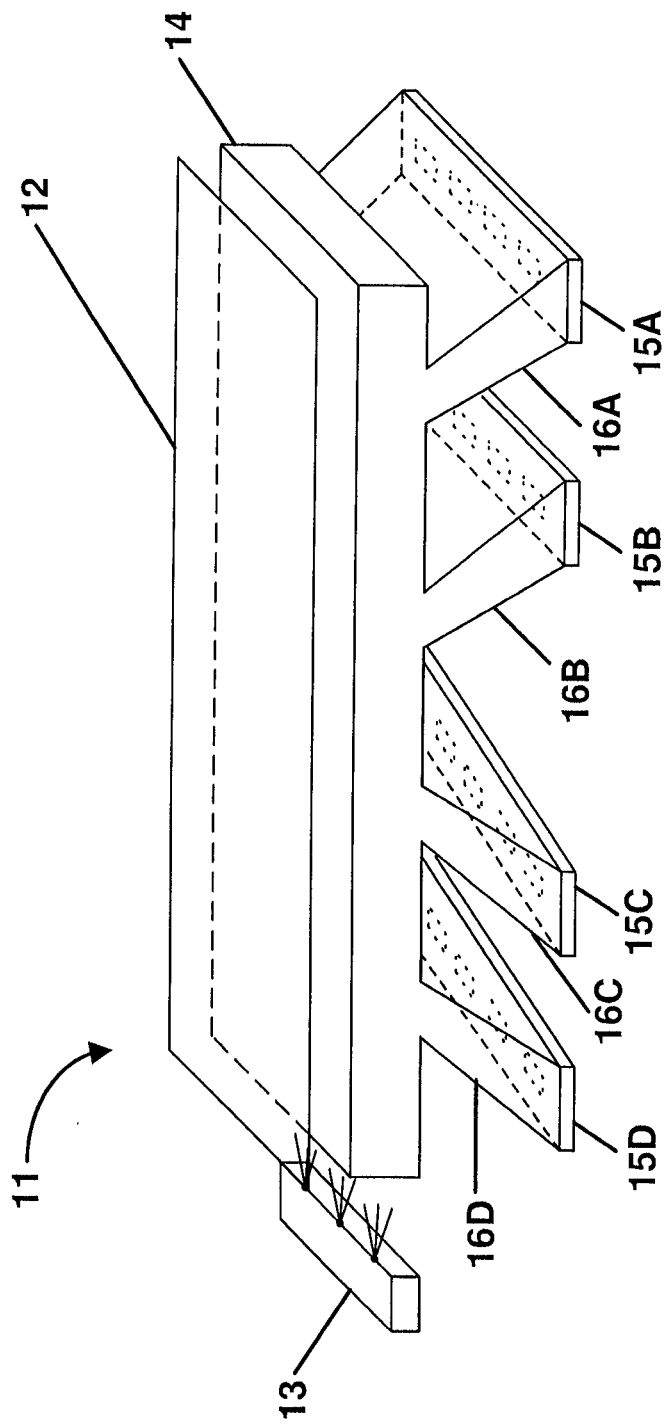
FIG. 2 is a schematic perspective view illustration of at least a portion of an exemplary LCD system including a waveguide element with angled extensions to receive light from a plurality of LEDs arranged in strips, according to one embodiment of the invention.

FIG. 2 is a schematic perspective view illustration of at least a portion of an exemplary LCD system 11 according to an embodiment of the present invention, including a LCD panel 12, waveguide element 14, first light source 13, and additional light sources 15A-15D, each coupled to the waveguide element 14 at the end of waveguide extensions 16A-16D, respectively. In FIG. 2, the first light source 13 provides light to a light entry region located along a lateral edge of the waveguide element 14 and additional strips of LED packages 15A-15D are optically coupled to the waveguide element 14 along light entry regions on extensions 16A-16D of the waveguide element 14.

Figure 3:
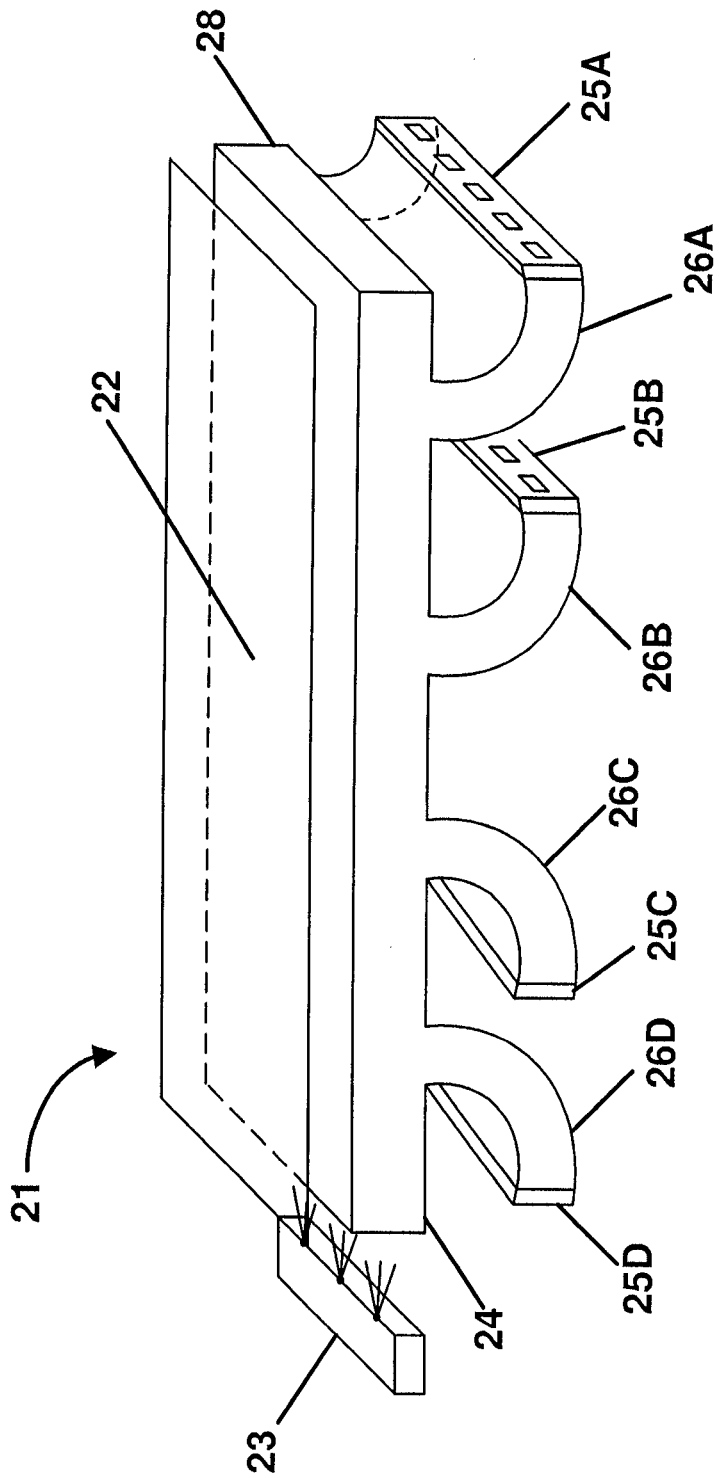
FIG. 3 is a schematic view illustration of at least a portion of an exemplary LCD system including a waveguide element with multiple extensions curved toward a principal plane of the waveguide element according to one embodiment of the invention.

FIG. 3 is a schematic perspective view illustration of at least a portion of an exemplary LCD system 21 according to one embodiment of the invention, the system including a LCD panel 22, waveguide element 24, and light sources 23, 25A, 25B coupled to the waveguide element 24 along an edge 27 of a primary waveguide surface and at the ends of waveguide extensions 26A, 26B, respectively. Additional light sources (not shown) are contemplated to be coupled to the waveguide element 24 at the end of waveguide extensions 26C and 26D, and along edge 28. Waveguide extensions 26A-26D are curved toward a primary plane of the waveguide element 24, such that the side profile of the resulting system 21 is thinner than it would otherwise be if the extensions 26A-26D were straight.

Figure 4:
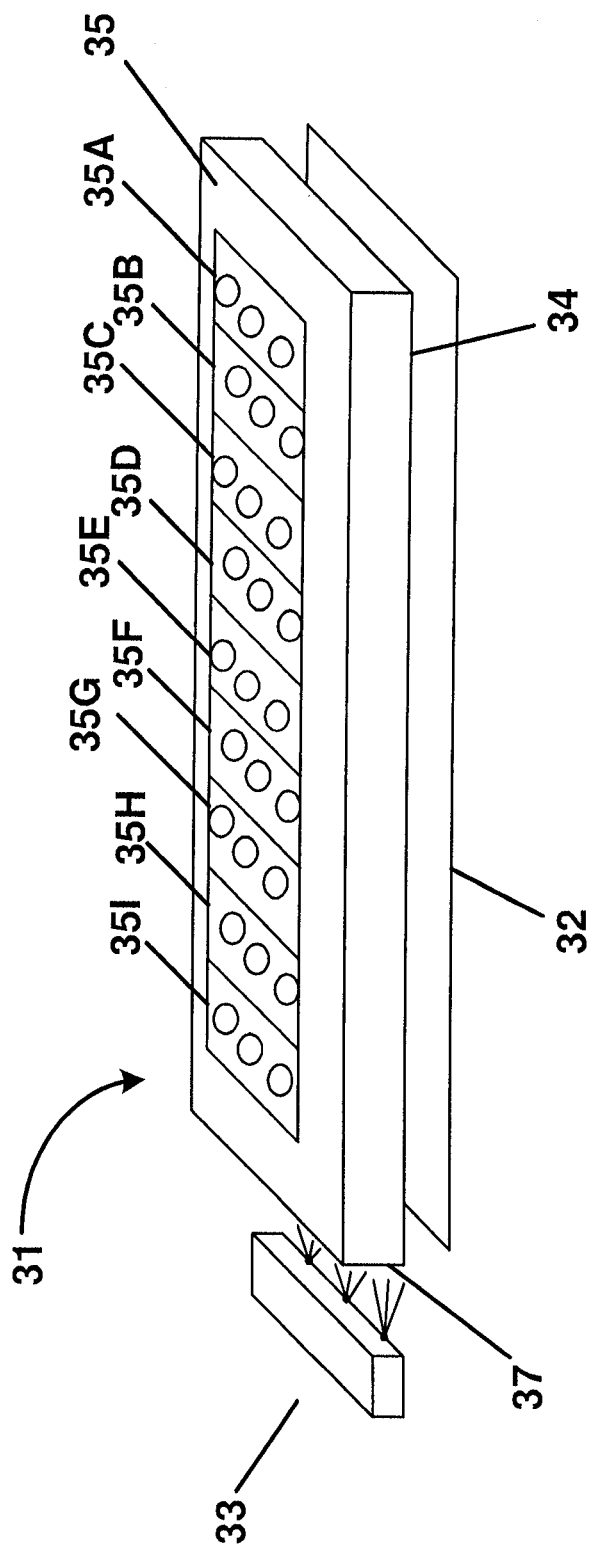
FIG. 4 is a schematic perspective view illustration of an exemplary LCD system including a waveguide element subject to both backlighting by a plurality of LEDs arranged in strips behind the LCD screen, and side backlighting by a plurality of LEDs arranged in strips along at least one side edge of the system according to one embodiment of the invention.

FIG. 4 is a schematic perspective view illustration view of an exemplary LCD system 31 according to one embodiment of the invention. The system 31 includes a LCD panel 32, a waveguide element 34, a first light source 33 optically coupled to an edge 37 of the waveguide element 34, and additional light sources 34A-34I optically coupled to the back side 35 of the waveguide element 34.

Various embodiments of the invention also provide methods of lighting a LCD panel utilizing light sources as described above. A LCD panel may be lit by any combination of light sources that provides complete and uniform illumination of the panel. Light may be provided to the panel from light sources located along edge or back regions of the waveguide element, by direct backlighting, or use of any combination of light sources arranged to emit light directly to a LCD panel and/or to emit light into one or more interposing waveguide elements.

Although the invention has been described with reference to the above embodiments, it will be understood that modifications and variations are encompassed within the spirit and scope of the invention. Accordingly, the invention is limited only by the following claims.

What is claimed is:

1. A LED lighting device comprising:
at least one waveguide element comprising a plurality of light entry regions;
a first light-emitting source comprising at least one first LED positioned to emit light into the at least one waveguide element at a first light entry region of the plurality of light entry regions; and
a second light-emitting source comprising at least one second LED positioned to emit light into the at least one waveguide element at a second light entry region of the plurality of light entry regions;
wherein the first light-emitting source and the second light-emitting source are arranged to illuminate different regions of a target surface; and
wherein the at least one waveguide element comprises a generally planar body structure portion including a major light emitting surface and including at least one waveguide extension joined to the body structure portion and that is non-coplanar with the body structure portion, and wherein any of the first light-emitting source and the second light-emitting source is coupled to the at least one waveguide extension.

2. A LED lighting device according to claim 1, wherein the first light-emitting source comprises a plurality of first LEDs arranged in a first strip, and wherein the second light-emitting source comprises a plurality of second LEDs arranged in a second strip.

3. A LED lighting device according to claim 1, wherein the at least one first LED includes multiple LEDs arranged in a first plurality of LED packages, and wherein the at least one second LED includes multiple LEDs arranged in a second plurality of LED packages.

4. A LED lighting device according to claim 3, wherein each LED package of the first plurality of LED packages and each LED package of the second plurality of LED packages includes at least one of the following features: a diffuser, a reflector, a lens, an electrostatic discharge diode, and multiple LEDs.

5. A LED lighting device according to claim 1, wherein each of the first light entry region and the second light entry region is disposed at a different location on the at least one waveguide element selected from: a top edge of the at least one waveguide element, a bottom edge of the at least one waveguide element, a first side edge of the at least one waveguide element, a second side edge of the at least one waveguide element, and a back side of the at least one waveguide element.

6. A LED lighting device according to claim 1, wherein the at least one waveguide element comprises at least one hole or recess arranged to receive at least one of the first light-emitting source and the second light-emitting source.

7. A LED lighting device according to claim 1, wherein the target surface comprises an illuminated surface of a liquid crystal display panel.

8. A LED lighting device according to claim 1, wherein any of the first light-emitting source and the second light-emitting source comprises at least one LED adapted to emit white light.

* * * * *